(12) United States Patent
Hamarneh (10) Patent No.: US 12,082,748 B2
(45) Date of Patent: Sep. 10, 2024

(54) FOOD PROCESSING DEVICE WITH INTEGRATED, FREELY-ROTATABLE AXIAL CONNECTOR

(71) Applicant: Omar Hamarneh, Amman (JO)

(72) Inventor: Omar Hamarneh, Amman (JO)

( * ) Notice: Subject to any disclaimer, the term of this patent is extended or adjusted under 35 U.S.C. 154(b) by 728 days.

(21) Appl. No.: 17/283,883

(22) PCT Filed: Apr. 4, 2019

(86) PCT No.: PCT/IB2019/052749
§ 371 (c)(1),
(2) Date: Apr. 8, 2021

(87) PCT Pub. No.: WO2020/074970
PCT Pub. Date: Apr. 16, 2020

(65) Prior Publication Data
US 2021/0345830 A1    Nov. 11, 2021

(30) Foreign Application Priority Data

Oct. 9, 2018    (WO) ................. PCT/JO2018/050010

(51) Int. Cl.
*A47J 43/08* (2006.01)
*A47J 43/044* (2006.01)
*A47J 43/07* (2006.01)

(52) U.S. Cl.
CPC ........... *A47J 43/082* (2013.01); *A47J 43/044* (2013.01); *A47J 43/0711* (2013.01); *A47J 2043/04427* (2013.01)

(58) Field of Classification Search
CPC ........ A47J 36/10; A47J 43/042; A47J 43/046; A47J 43/0722; A47J 43/0761;
(Continued)

(56) References Cited

U.S. PATENT DOCUMENTS

| 5,360,170 A * | 11/1994 | Cartellone .......... A47J 43/0705 241/282.1 |
| 6,000,650 A | 12/1999 | Penaranda et al. |

(Continued)

FOREIGN PATENT DOCUMENTS

| DE | 102012203425 A1 | 9/2013 |
| EP | 0475470 A2 | 3/1992 |

(Continued)

OTHER PUBLICATIONS

Austria International Searching Authority; International Search Report & Written Opinion for PCT/JO2018/050010; 9 pages; Mar. 4, 2019; Vienna, AT.

(Continued)

*Primary Examiner* — Charles Cooley
(74) *Attorney, Agent, or Firm* — Oblon, McClelland, Maier & Neustadt, L.L.P.

(57) ABSTRACT

A food processing device capable of chopping foodstuff can be used indoors and suitable to be used outdoors. The device may include a food processing container with a base, a wall, and a removable lid with an opening and a pass-through aperture, the base having a cylindrical protrusion and a pin extending therefrom; a food processing tool with a shaft and a plurality of blades, the food processing tool is configured to be connected to the pin extending from the base; a connector; a coupling unit having a wall and a slidable member; and a driver The connector may be configured to connect the food processing tool to the coupling unit. The coupling unit may be configured to connect the connector to the driver.

20 Claims, 14 Drawing Sheets

(58) Field of Classification Search
CPC .... A47J 43/085; A47J 43/075; A47J 43/0766; A47J 43/0772; A47J 43/0777; A47J 44/00; B02C 23/00
USPC .......................................................... 366/129
See application file for complete search history.

(56) References Cited

U.S. PATENT DOCUMENTS

| | | | |
|---|---|---|---|
| 2007/0133342 | A1 | 6/2007 | Sergi et al. |
| 2014/0203127 | A1* | 7/2014 | Merl ................ A47J 43/0711 241/285.2 |
| 2015/0164279 | A1* | 6/2015 | Ryan ................... A47J 44/02 366/279 |
| 2021/0267417 | A1* | 9/2021 | Quinesser ........... A47J 43/0705 |
| 2021/0345830 | A1* | 11/2021 | Hamarneh .......... A47J 43/0711 |
| 2021/0378451 | A1* | 12/2021 | Hamarneh .......... A47J 43/0705 |

FOREIGN PATENT DOCUMENTS

| | | | | |
|---|---|---|---|---|
| EP | 0529287 | A2 | 3/1993 | |
| KR | 1448463 | B1 * | 10/2014 | ............ A47J 43/044 |
| KR | 101448463 | B1 | 10/2014 | |
| WO | WO-0048498 | A1 * | 8/2000 | .............. A47J 43/06 |
| WO | WO-2020064488 | A1 * | 4/2020 | .......... A47J 43/0705 |
| WO | WO-2020074970 | A1 * | 4/2020 | ............ A47J 43/044 |
| WO | WO-2020075211 | A1 * | 4/2020 | .......... A47J 43/0705 |

OTHER PUBLICATIONS

Austria International Searching Authority; International Search Report & Written Opinion for PCT/IB2019/052749; 7 pages; Jul. 11, 2019; Vienna, AT.

* cited by examiner

FOOD PROCESSING DEVICE WITH INTEGRATED, FREELY-ROTATABLE AXIAL CONNECTOR

CROSS-REFERENCE TO RELATED APPLICATIONS

The present application is the national stage of and claims priority to international application PCT/IB2019/052749, filed on Apr. 4, 2019, and claims the benefit of the filing date of international Appl. No. PCT/JO2018/050010, filed on Oct. 9, 2018.

TECHNICAL FIELD

The present disclosure relates to food processing devices and apparatuses, and more particularly to automated food processing devices that are suitable for both indoor and outdoor uses.

BACKGROUND INFORMATION

Conventional food processing devices generally include an electrically powered driver, a food processing container with one or more blades and a removable lid.

Attempts to provide portable food processing devices have been made in the art. These may be suitable for indoor and outdoor use; however, some are manually operated and require effort to have the food stuff cut/chopped while others are battery operated and have their own drivers, or actuators.

SUMMARY

Aspects of the present disclosure provide a food processing device capable of chopping foodstuff, including:
 a food processing container with a base and a circumferential wall extending from the base, and a removable lid with an opening and a pass-through aperture, the base having a cylindrical protrusion and a pin extending therefrom, the pin is aligned with a central axis of the base;
 a food processing tool with a shaft and a plurality of blades;
 a connector; and
 a coupling unit having a wall and a slidable member, wherein
  said connector is configured to connect said food processing tool to said coupling unit; and
  said coupling unit is configured to connect said connector to said driver.

In some aspects, the food processing device may also include a driver.

In aspects of the present disclosure, the driver may include a rotary power tool.

In some aspects, the driver may include a power drill.

In some aspects, the opening and the pass-through aperture of the removable lid may be aligned with the central axis of the base.

In some aspects, the opening of the removable lid may be configured to receive a substantial part of the coupling unit.

In other aspects, the pin of the base may include a plurality of protrusions in proximity to an upper end of such pin.

In yet other aspects, the food processing tool may further include an opening configured to receive the pin of the food processing container.

In other aspects, the food processing tool is configured to be connected to the pin extending from said base.

In other aspects, the connector may include a body with a cylindrical protrusion at an upper surface of such body and an opening at a lower surface of such body, the opening being configured to receive a plurality of protrusions positioned at an upper end of the food processing tool's shaft.

In some aspects, a part of the connector may be configured to pass through the pass-through opening of the lid.

In other aspects, the coupling unit may further include a main wall with a plurality of lateral apertures configured to receive protrusions extending from the slidable member, and an auxiliary wall extending from the main wall.

In other aspects, the slidable member of the coupling unit may include a first elongated member and a second elongated member aligned to each other, and wherein the first elongated member has a polygonal opening configured to receive a polygonal extrusion extending from the connector.

In some aspects, the first elongated member and second elongated member of the slidable member may extend in opposing directions.

In some aspects, the second elongated member of the slidable member may be configured to be inserted in a driver's chuck.

In other aspects, the auxiliary wall may be lined with an elastic material.

In some aspects of the present disclosure, the auxiliary wall may be tapered.

In aspects of the present disclosure, the auxiliary wall may be configured to circumfuse a substantial part of a driver's chuck.

BRIEF DESCRIPTION OF THE DRAWINGS

Aspects of the present disclosure will now be described with reference to the accompanying drawings, which illustrates embodiments of the present disclosure, without limiting the scope of thereof, and in which.

DETAILED DESCRIPTION

Figure 1:
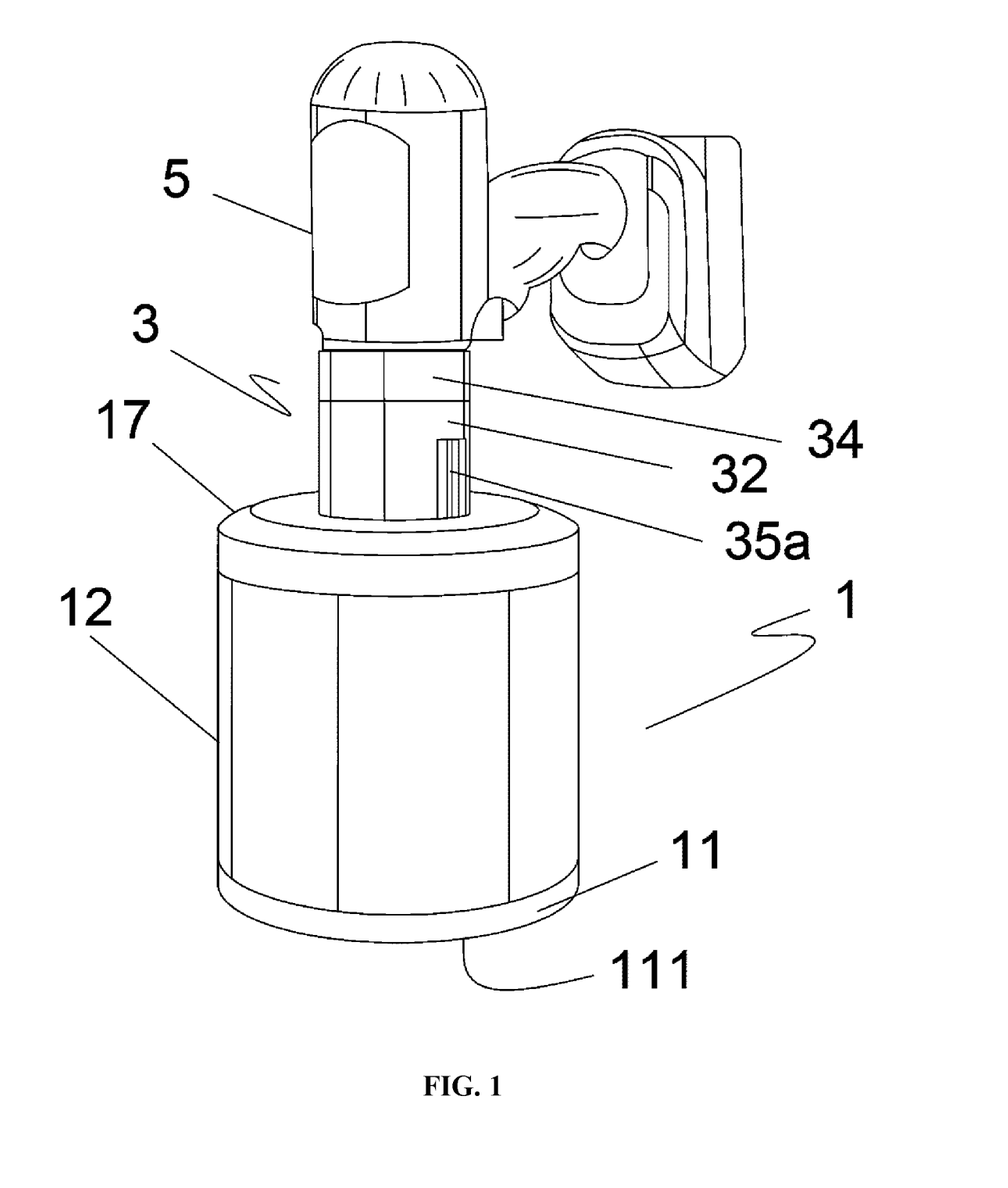
FIG. 1 illustrates a perspective view of a food processing device configured in accordance with embodiments of the present disclosure.
Figure 2:
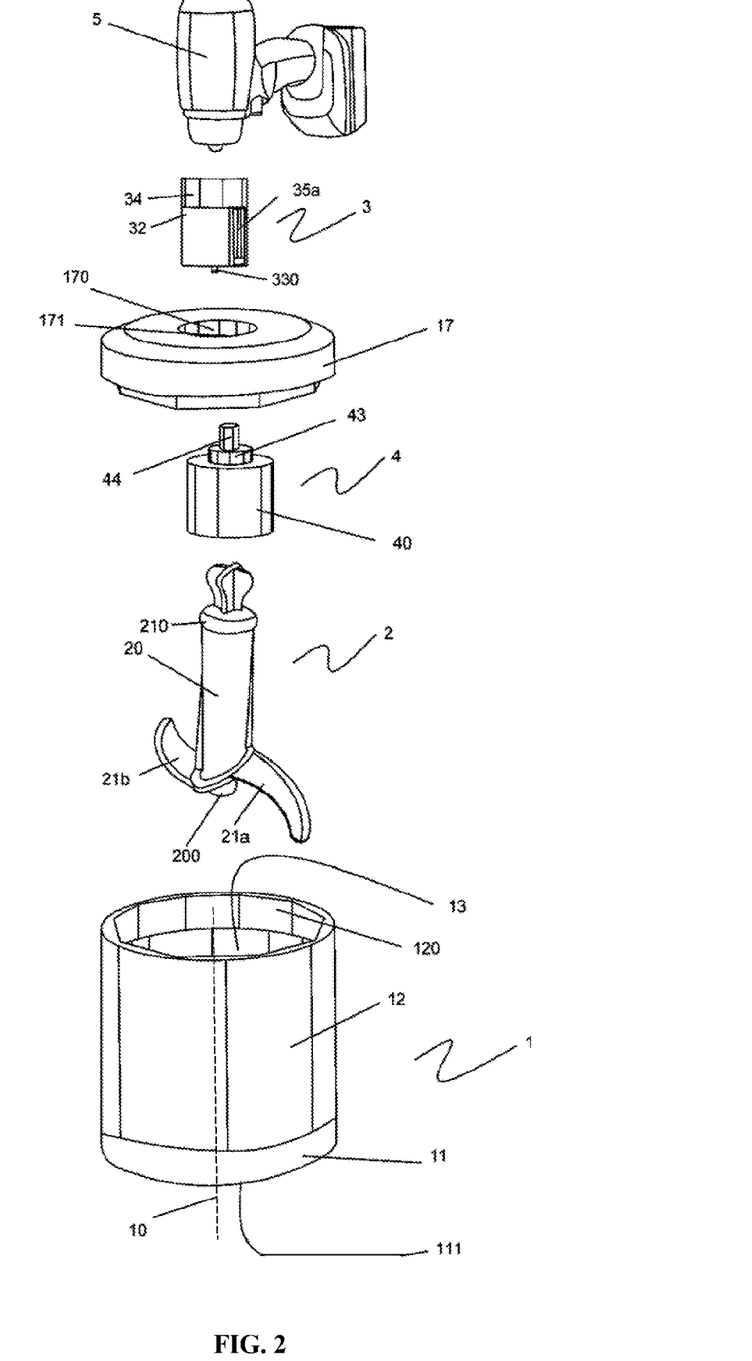
FIG. 2 illustrates an exploded view of a food processing device configured in accordance with embodiments of the present disclosure.

FIGS. 1-14 illustrate a food processing device that is suitable for outdoor use, and that does not need to be directly connected to an electric power source, configured in accordance with embodiments of the present disclosure. Referring now to FIGS. 1-2, the food processing device may include a food processing container 1, a food processing tool 2, a coupling unit 3, a connector 4, and a driver 5.

Figure 3:
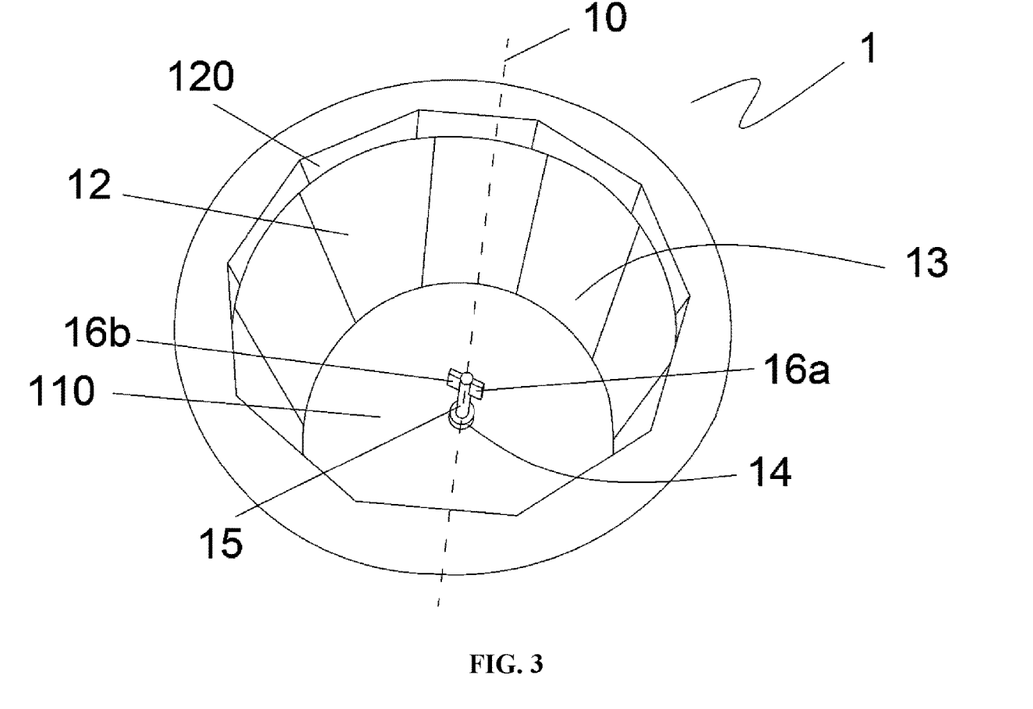
FIG. 3 illustrates a perspective view of a food processing container of a food processing device without a removable lid, configured in accordance with embodiments of the present disclosure.
Figure 4:
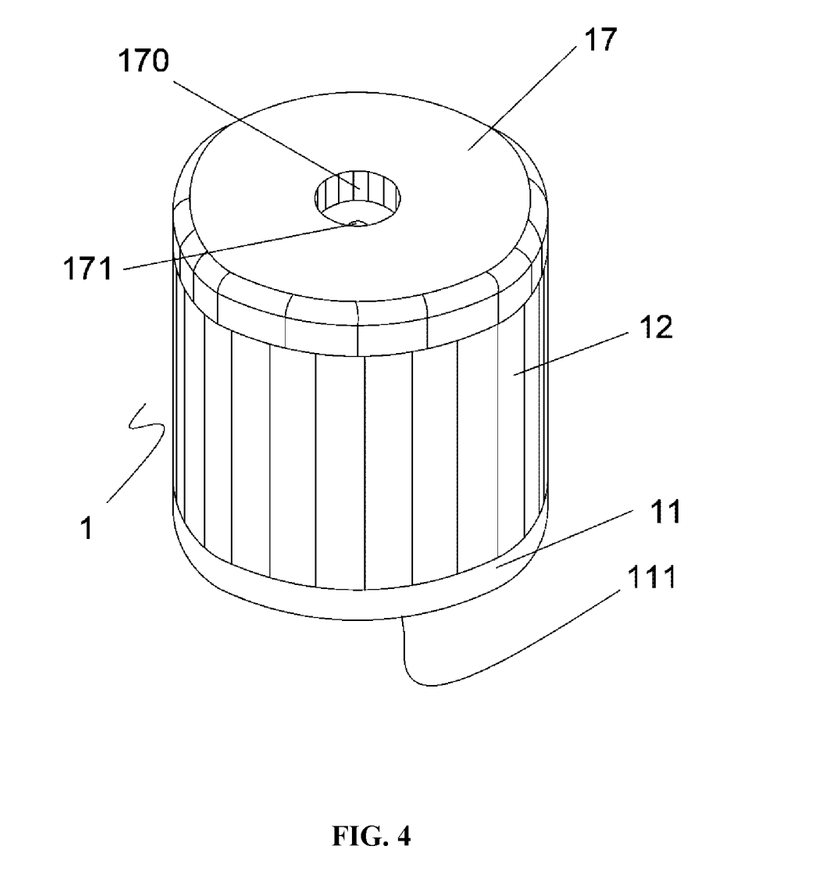
FIG. 4 illustrates a perspective view of a food container of a food processing device with a removable lid attached, configured in accordance with embodiments of the present disclosure.
Figure 5:
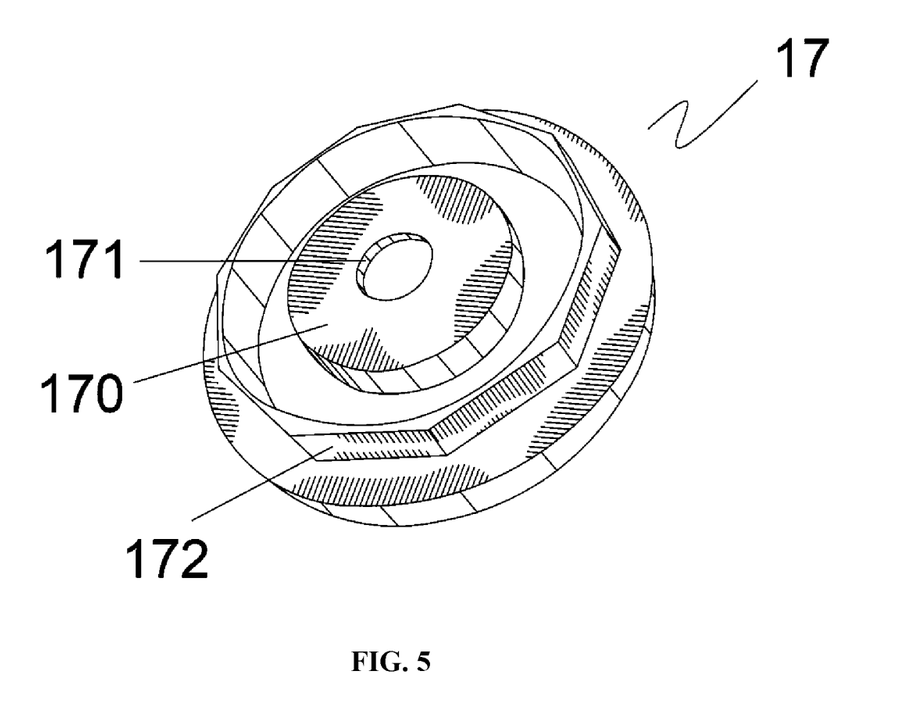
FIG. 5 illustrates a bottom perspective view of a food container's lid of a food processing device with a removable lid attached, configured in accordance with embodiments of the present disclosure.

Referring to FIGS. 3-5, the food processing container 1 in embodiments of the present disclosure, has a central axis 10, and may include a base 11 with an upper surface 110 and a lower surface 111, and a circumferential wall 12 extending vertically from the base 11 defining a volume 13, the circumferential wall 12 may include a polygonal upper edge 120 from the inside of the circumferential wall 12. The upper surface 110 of the base 11 may include a central protrusion 14 with a pin 15 vertically extending therefrom with a plurality of protrusions 16a, 16b extending radially outwardly from a distal end of the pin 15. The food processing container may further include a detachable lid 17 (FIGS. 1-2 and 4-5) that may enclose the volume 13 when coupled to the food processing container 1. The lid 17 may have an opening 170 with a pass-through aperture 171, and a polygonal wall 172 extending from a lower surface of such lid 17. In embodiments of the present disclosure, the polygonal upper edge 120 of said wall 12 may be configured to receive and engage with the polygonal wall 172 of the lid 17. The lower surface 111 of the base 11 may be flat to be able to reside over a flat surface.

Figure 6:
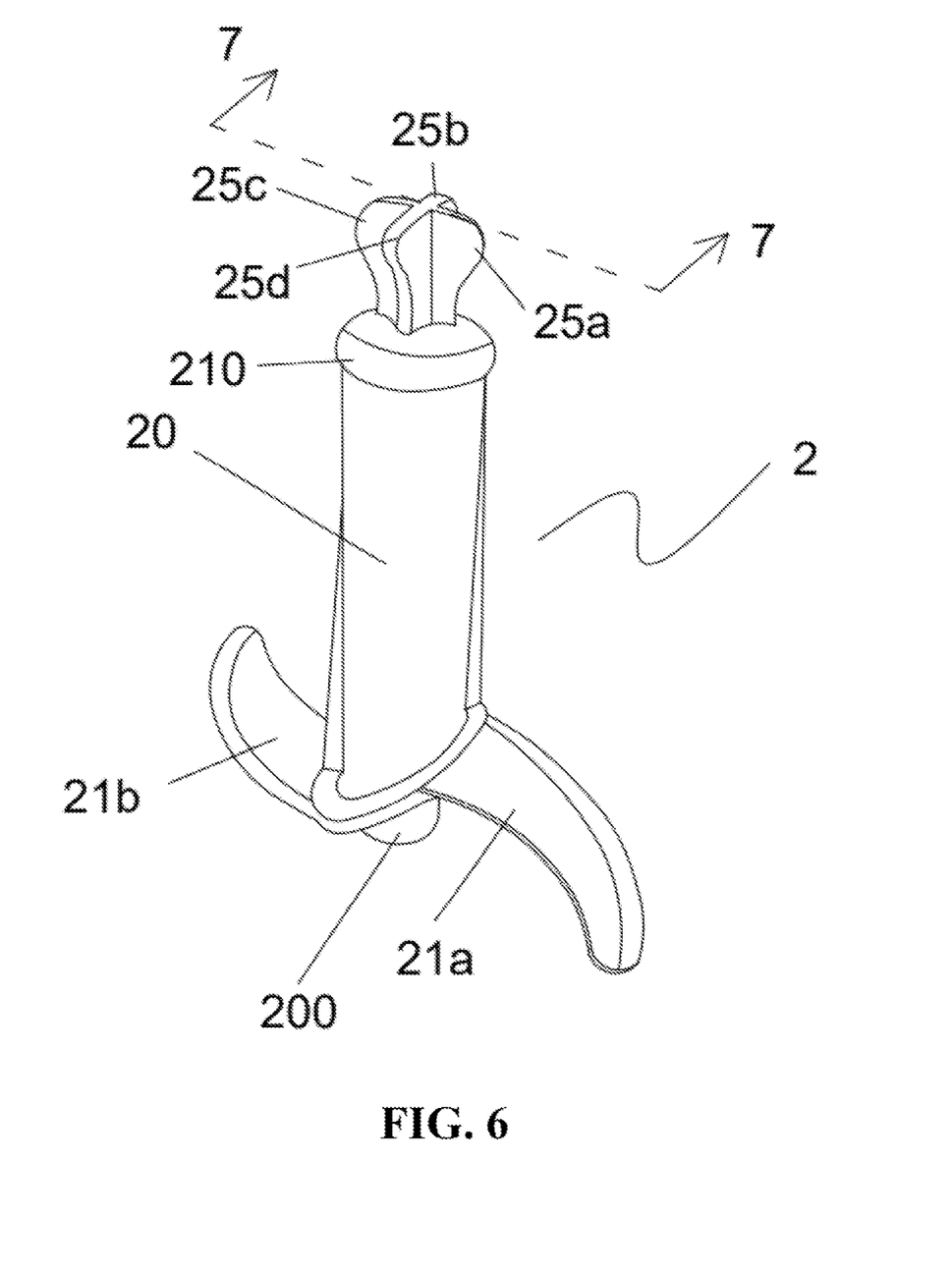
FIG. 6 illustrates a perspective view of a food processing tool of a food processing device configured in accordance with embodiments of the present disclosure.
Figure 7:
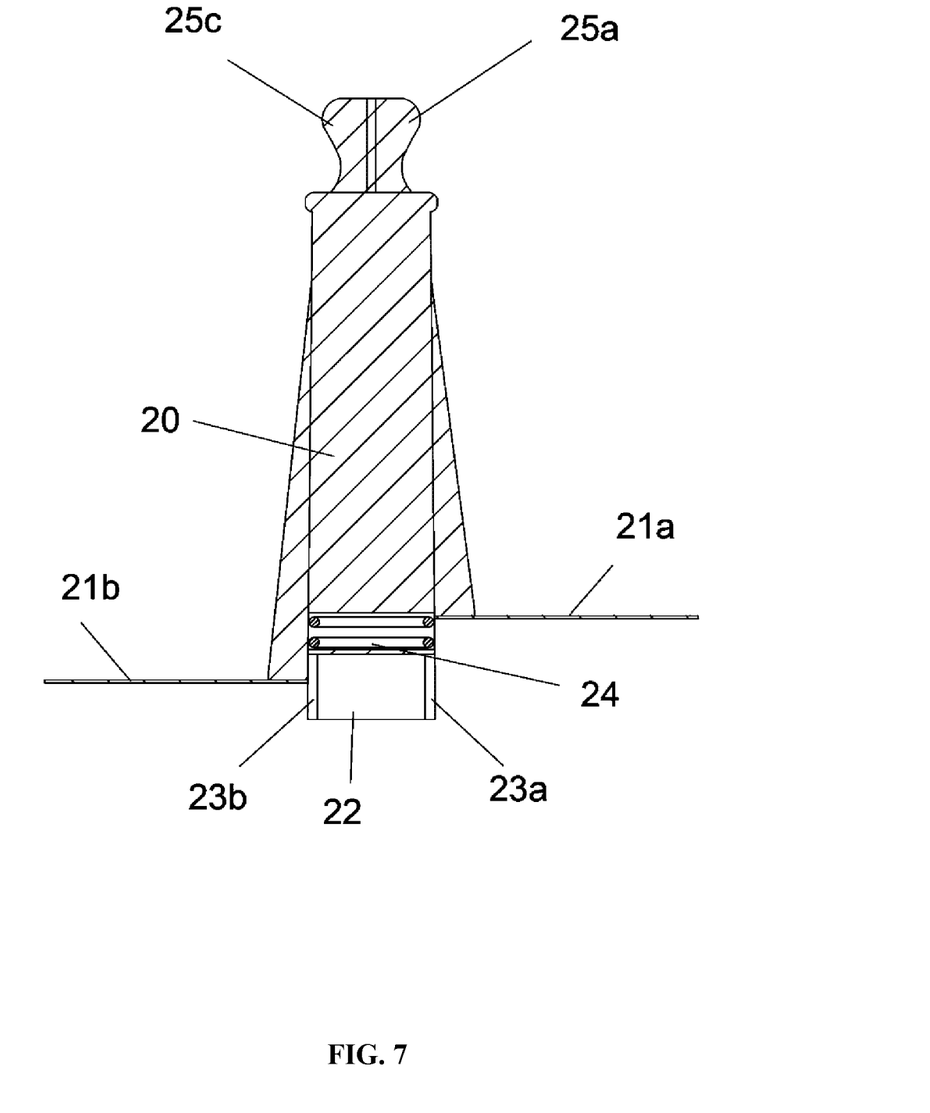
FIG. 7 illustrates a cross-sectional view of a food processing tool of a food processing device taken along the line 7-7 of FIG. 6.
Figure 8:
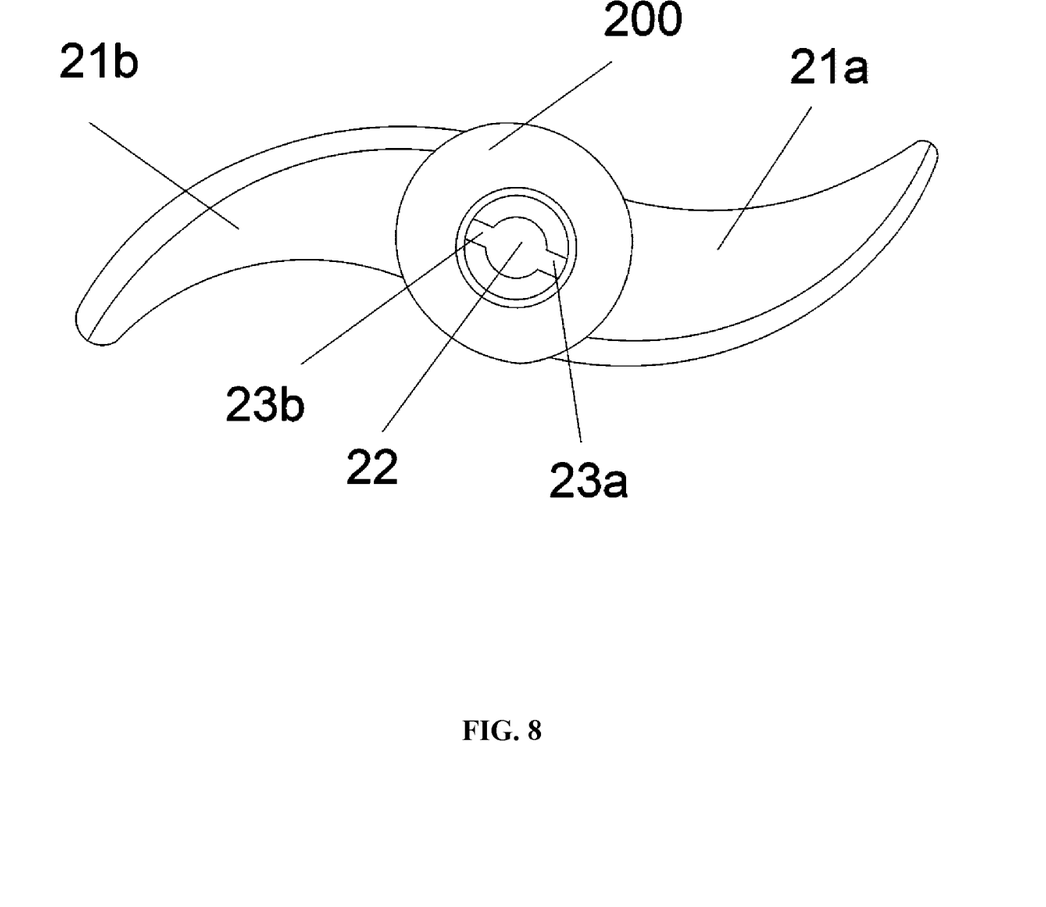
FIG. 8 illustrates a bottom view of a food processing tool of a food processing device configured in accordance with embodiments of the present disclosure.

Referring now to FIGS. 6-8, the food processing tool 2 in embodiments of the present disclosure may include a shaft 20 with a proximal end 200 and a distal end 210 with a one or more blades 21a, 21b extending radially outwardly from a position proximal to the proximal end 200 of the shaft 20. The proximal end 200 may have a cylindrical opening 22 with a one or more grooves 23a, 23b (FIG. 7-8). The distal end 210 may have a plurality of protrusions 25a, 25b, 25c, 25d.

The one or more blades 21a, 21b may have a curved shape and may have vertical displacement between each other.

In embodiments of the present disclosure, the number of protrusions 16a, 16b may be similar to the number of grooves 23a, 23b.

In embodiments of the present disclosure, the cylindrical opening 22 with the one or more grooves 23a, 23b in the food processing tool 2 may be configured to receive the pin 15 and the one or more protrusions 16a, 16b.

A spring 24 (FIG. 7) along with the one or more protrusions 16a, 16b (FIG. 3) and the one or more grooves 23a, 23b may act as a locking mechanism that prevents the shaft 20 from rotating about the pin 15 of the food processing container 2 unless a downward force is applied to the shaft 20 that pushes is towards the upper surface 110 of the base 11. In a default position, when no downward force is applied to the shaft 20, the one or more protrusions 16a, 16b may be residing in the one or more grooves 23a, 23b, thus the shaft 20 will be unable to rotate about the shaft 20. When a downward force is applied to the shaft 20, the shaft 20 moves down towards the upper surface 110 of the base 11 and the one or more protrusions 16a, 16b will be further beyond the one or more grooves 23a, 23b within the cylindrical opening 22 rendering the shaft 20 able to rotate about the pin 15. The downward force in embodiments of the present disclosure may be applied by the weight of the coupling unit 3, and the driver 5.

The central protrusion 14 (FIG. 3) may act as a stopper for the shaft 20 in order to ensure a sufficient displacement between the one or more blades 21a, 21b and the base 11. This sufficient displacement should allow the rotation of the food processing tool about the shaft 15 (FIG. 3) without having the one or more blades 23a, 23b touching the upper surface 110 of the food container base 11, thus ensuring a smooth rotation of the one or more blades 23a, 23b and an effective processing of food items contained within the food processing container 1.

Reference is now being made to FIGS. 9-12. In embodiments of the present disclosure, the coupling unit 3 may include a central axis 30, a base 31, a main wall 32 extending vertically from the base 31, a sliding member 33, and an auxiliary wall 34 extending from a substantial part of the main wall 32. The base 31 may include a pass-through opening 310 aligned with the central axis 30, and the sliding member 33 may include a first elongated member 330 and a second elongated member 340, wherein the first and second elongated members 330, 340 may be coaxially aligned with the central axis 30 and may extend in opposing directions to each other. The first elongated member 330 may be able to pass through the pass-through opening 310 of the base 30 and may include a polygonal aperture 3300. In embodiments of the present disclosure, the main wall 32 may include a plurality of lateral apertures 35a, 35b, formed on an outside surface of the main wall 32. The sliding member 33 may further include a plurality of protrusions 350a, 350b passing through the plurality of lateral apertures 35a, 35b, wherein such plurality of protrusions 350a, 350b may allow a user to slide the sliding member 33 along the axis 30.

The sliding member 33 may slide within the coupling unit 3 along the central axis 30 when a user slides the plurality of protrusions 350a, 350b through the plurality of the lateral apertures 35a, 35b.

Figure 9:
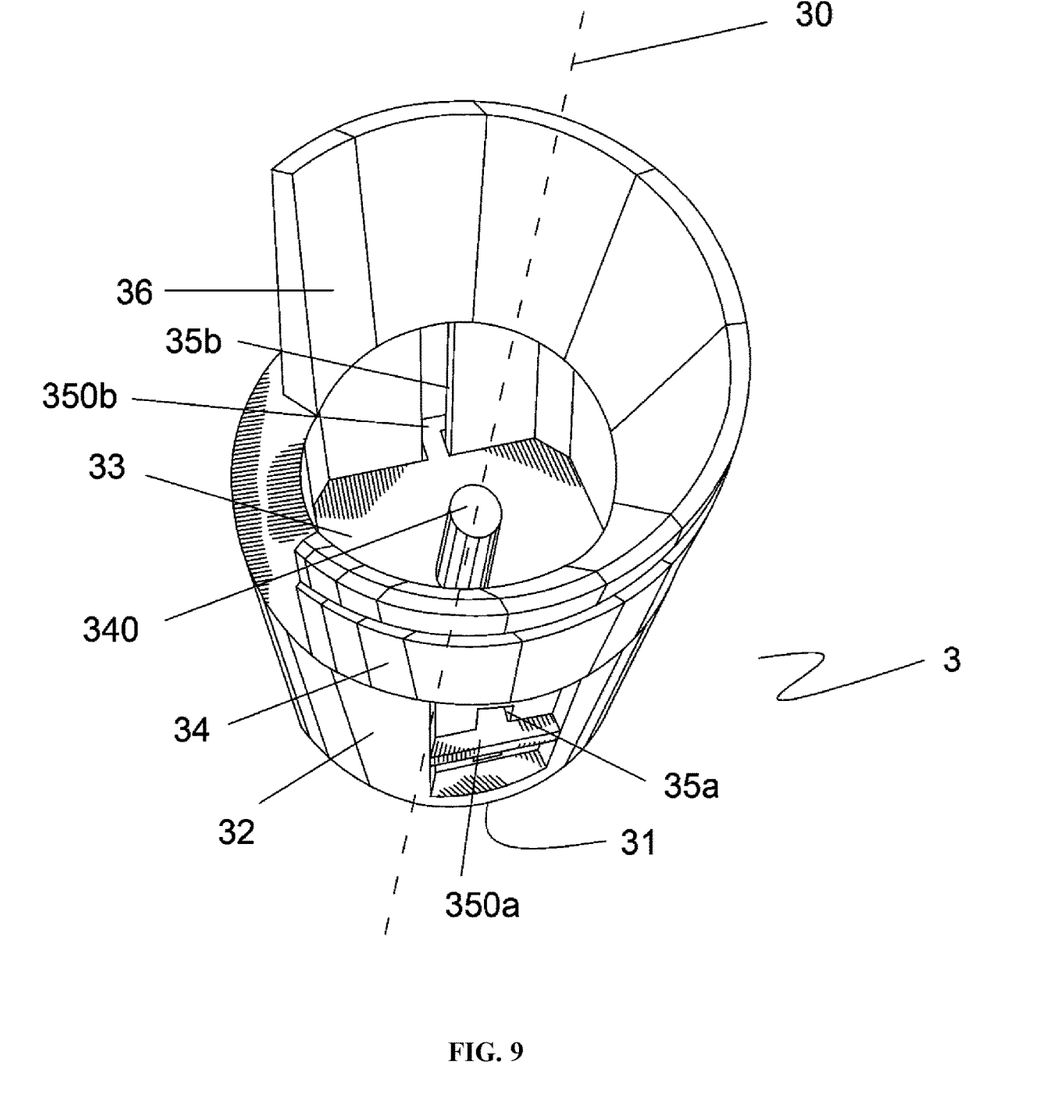
FIG. 9 illustrates a perspective view of a coupling unit of a food processing device configured in accordance with embodiments of the present disclosure.
Figure 10:
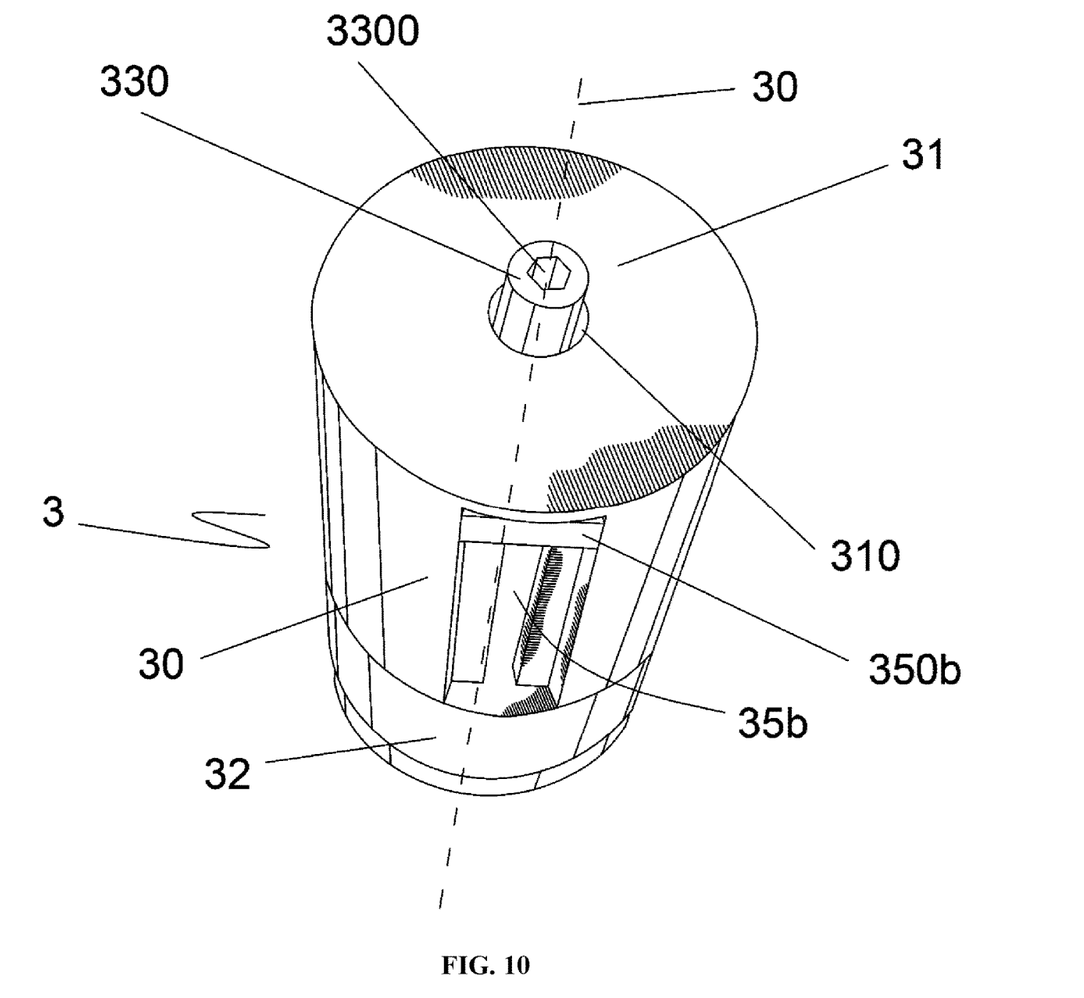
FIG. 10 illustrates a bottom perspective view of a coupling unit of a food processing device configured in accordance with embodiments of the present disclosure.
Figure 11:
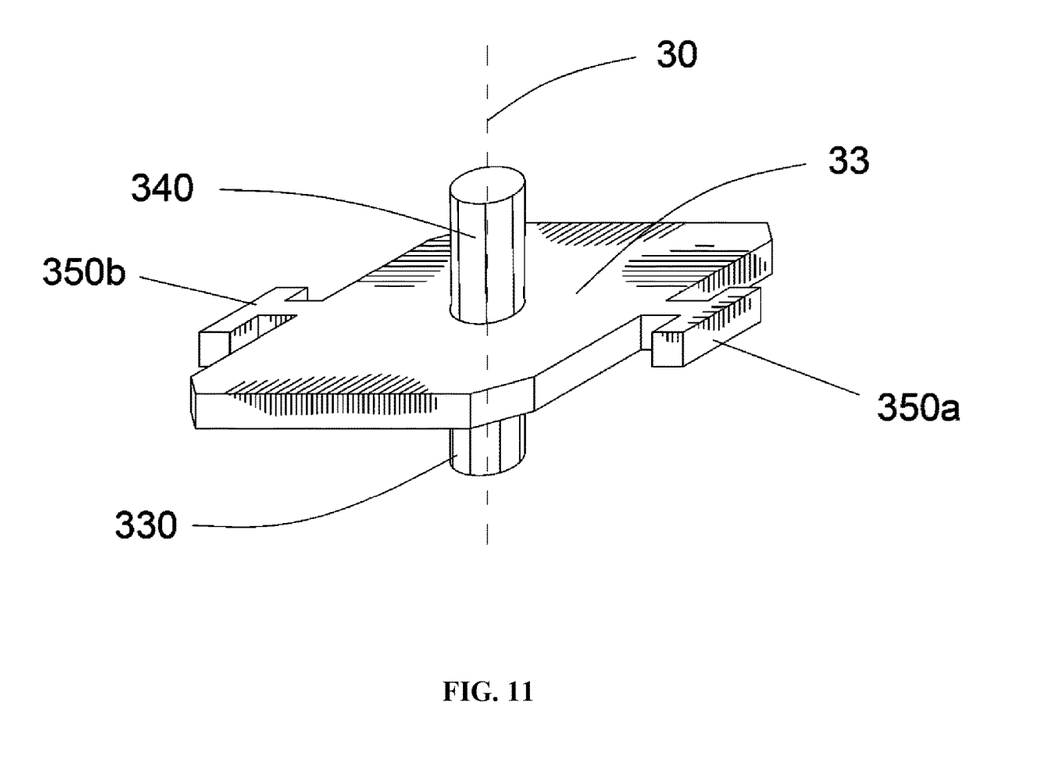
FIG. 11 illustrates a perspective view of a sliding member of a coupling unit of a food processing device configured in accordance with embodiments of the present disclosure.
Figure 12:
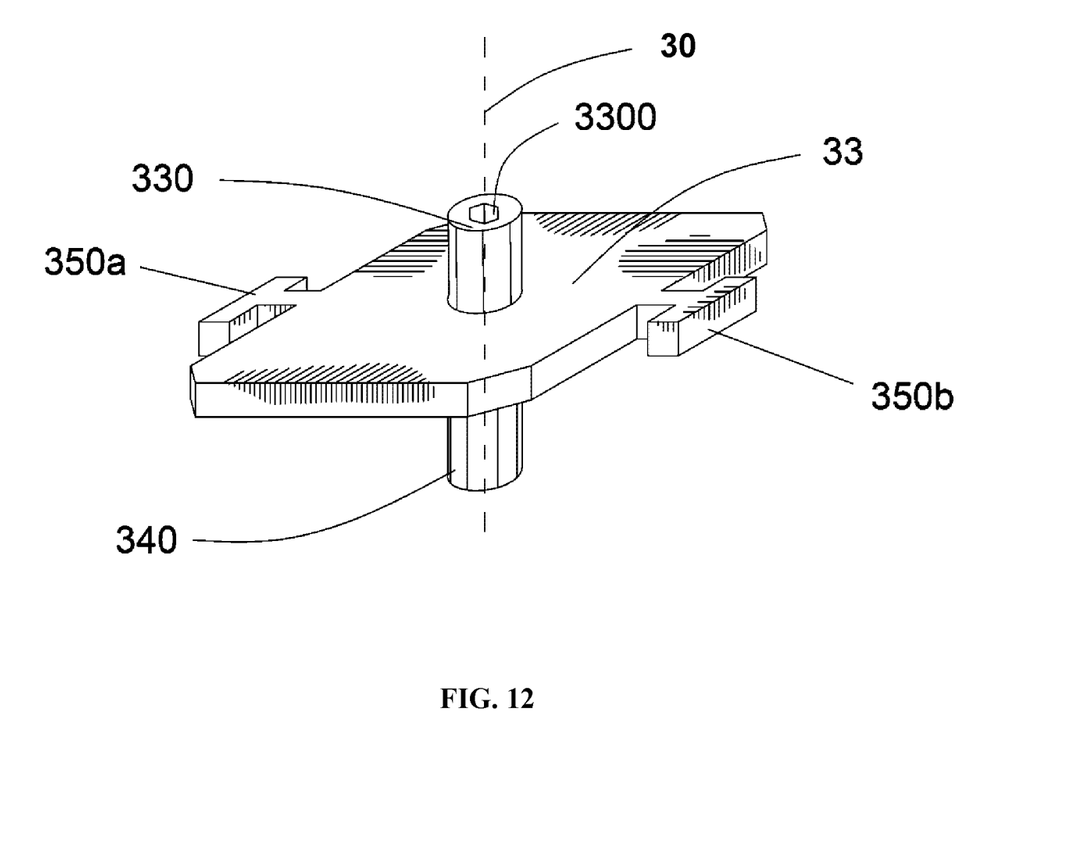
FIG. 12 illustrates a bottom perspective view of a sliding member of a coupling unit of a food processing device configured in accordance with embodiments of the present disclosure.

In embodiments of the present disclosure, the auxiliary wall 34 may be lined with an elastic material 36, such as rubber, and may have a tapered inner surface.

In embodiments of the present disclosure, the coupling unit 3 may provide an interface between the driver 5 and the connector 4. The connector 4 may connect the coupling unit 3 to the food processing tool 2 (FIG. 2).

Figure 13:
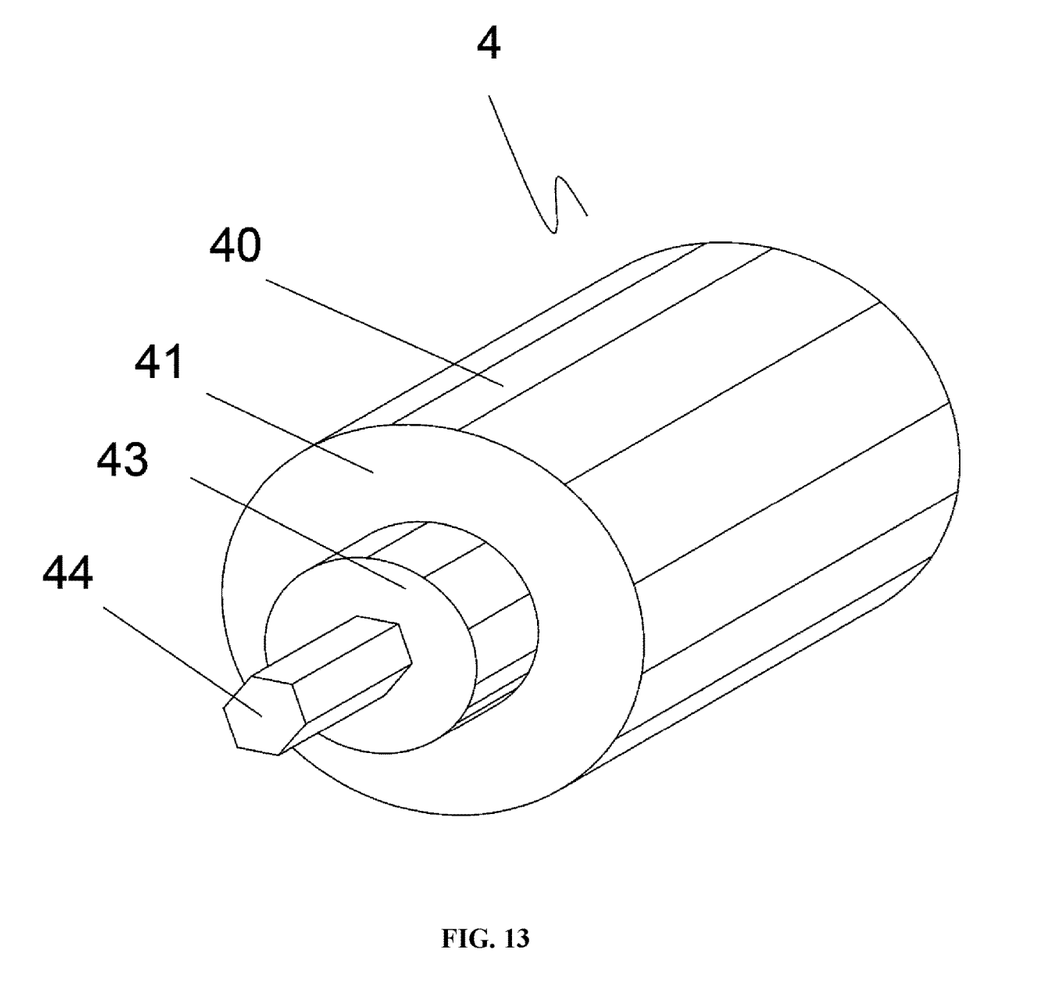
FIG. 13 illustrates a perspective view of a connector of a food processing device configured in accordance with embodiments of the present disclosure.
Figure 14:
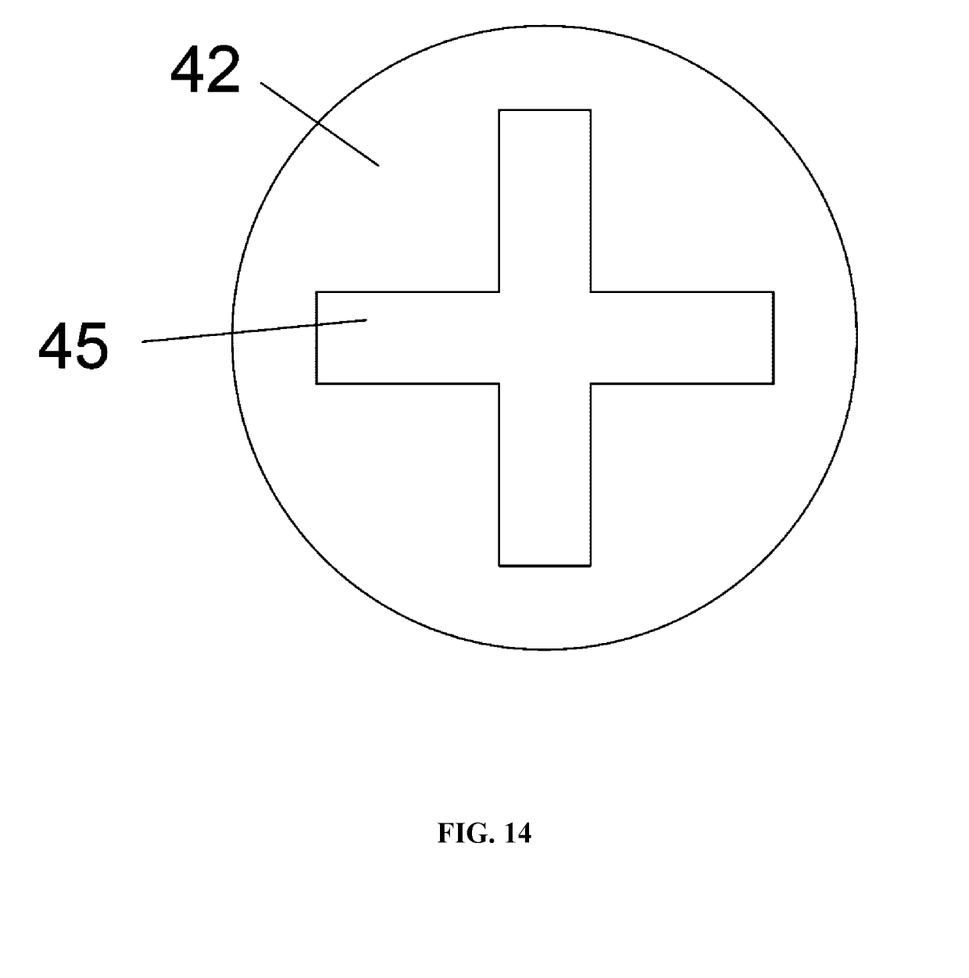
FIG. 14 illustrates a bottom view of a connector of a food processing device configured in accordance with embodiments of the present disclosure.

Referring now to FIGS. 13-14, the connector 4 may act as a motion transmitter from the coupling unit 3 to the food processing tool 2, and may engage the coupling unit 3 to the food processing tool 2. The connector 4 may include a body 40 with an upper surface 41 and a lower surface 42, wherein the upper surface 41 may include a central protrusion 43 with a polygonal extrusion 44 vertically extending therefrom, and wherein the lower surface 42 may include an aperture 45 having a profile similar to the collective profile of the plurality of protrusions 25a, 25b, 25c, 25d of the food processing tool 2 (FIG. 6). The polygonal extrusion 44 may have a profile similar to the polygonal aperture 3300 in the coupling unit 3. The aperture 45 may be configured to receive the plurality of protrusions 25a, 25b, 25c, 25d of the food processing tool 2, and the polygonal aperture 3300 may be configured to receive the polygonal extrusion. The similar profile of the aperture 45 and the plurality of protrusions 25a, 25b, 25c, 25d prevents the relative rotation between such connector 4 and the food processing tool 2, and the similar profile of the polygonal extrusion 44 and the polygonal aperture 3300 prevents relative rotation between such polygonal extrusion 44 and the coupling unit 3. In embodiments of the present disclosure, the connector 4 may transmit torque from the coupling unit 3 to the food processing tool 2, thus allowing the food processing tool to process food items contained in the food processing container 1.

Referring back to FIGS. 1-2, the driver 5 in embodiments of the present disclosure, may include a conventional rotary power tool with a chuck, such a drilling tool. The chuck of the drilling tool may receive the second elongated member 340 of the coupling unit 3 (FIGS. 8, 10) in the place dedicated for drilling bits, and the auxiliary wall 34 of the coupling unit 3 may be configured to circumfuse a substantial part of the chuck. Such a configuration may allow the coupling unit 3 to rotate about the central axis 30 when the driver 5 is operated. In embodiments of the present disclosure, the coupling unit 3 (FIGS. 9-12) may prevent dust and/or debris suspended on the chuck of the drilling tool from being transferred to the food items being processed since the coupling unit may enclose the chuck of the drilling tool, thus all debris and/or dust will be contained within the coupling unit 3. The configuration of the sliding member 33, the auxiliary wall 34, and the elastic material 36 may allow the device of the present disclosure to be compatible with different sizes of the driver 5. This is since the sliding member 33 is free to slide along the central axis 30 till the second elongated member 340 is inserted in the driver chuck, and the tapered shape of the auxiliary wall 34 and the elastic material 36 allows the receipt of different driver chucks with different diameters.

The coupling unit 3 may connect the driver 5 to the connector 4, and the connector 4 may connect the coupling unit 3 to the food processing tool 2.

In some embodiments, the connector 4 (FIGS. 13-14) may be integrated with the pass-through aperture 171 (FIG. 4) while being free to rotate about the central axis 10 (FIG. 3) of the food processing container 1.

In other embodiments, the connector 4 may be integrated with the food processing tool 2 while being free to rotate about the central axis 10 of the food processing container 1.

In embodiments of the present disclosure, when the cylindrical opening 22 (FIG. 7) receives the pin 15 (FIG. 3), and when the aperture 45 (FIG. 14) receives the plurality of protrusions 25a, 25b, 25c, 25d (FIG. 6), also when the polygonal aperture 3300 (FIGS. 10, 12) receives the polygonal extrusion 44 (FIG. 14), and when the second elongated member 340 (FIGS. 8, 10) is inserted in the driver chuck, the food processing device will be ready to be used.

The volume 13 (FIG. 3) in embodiments of the present disclosure may be configured to receive the food processing tool 2 (FIGS. 6-7) and the connector 4 (FIGS. 13-14).

In embodiments of the present disclosure, the food processing device, when operated, may process, i.e. chop, foodstuff contained in the volume 13 (FIG. 3). The operation of the food processing device in embodiments of the present disclosure may be achieved by connecting the device components with each other as described above, then operating the driver 5. When the driver 5 operates, the coupling unit 3 will rotate about the central axis 30, which will accordingly initiate a rotation motion of the connector 4. When the connector 4 rotates, it forces the food processing tool 2 to rotate in a similar direction of rotation of the connector 4, coupling unit 3, and the driver 5. The rotation motion of the food processing tool 2 will allow the one or more blades 23a, 23b to process, i.e. chop, foodstuff contained in the volume 13.

The food processing container 1, the food processing tool 2, the coupling unit 3, and the connector 4 may be made of any suitable rigid material such as plastic.

The plurality of blades 21a, 21b may be made of any suitable rigid material, such as stainless steel.

The food processing device of this disclosure may be used indoors and is suitable to be used outdoors, such as in tail gating activities.

The use of the term "and" in the claims is used to mean "and/or" unless explicitly indicated to refer to collective nature only.

As used herein with respect to an identified property or circumstance, "substantially" refers to a degree of deviation that is sufficiently small so as to not measurably detract from the identified property or circumstance. The exact degree of deviation allowable may in some cases depend on the specific context.

While the present disclosure has been made in detail and with reference to specific embodiments, it will be apparent to those skilled in the art that various additions, omissions, or amendments can be made without departing from the scope and spirit thereof.

What is claimed is:

1. A food processing device, comprising:
a food processing container with a base and a circumferential wall extending from the base, and a removable lid with an opening and a pass-through aperture, the base having a cylindrical protrusion and a pin extending therefrom, the pin is aligned with a central line of the base;
a food processing tool with a shaft and a plurality of blades;
a connector; and
a coupling unit having a slidable member,
wherein the connector is configured to connect the food processing tool to the coupling unit,
wherein the coupling unit is configured to connect the connector to a driver, and
wherein the connector is integrated with the food processing tool and is free to rotate about the central line.

2. The device of claim 1, further comprising:
a driver.

3. The device of claim 2, wherein the driver comprises a rotary power tool.

4. The device of claim 1, wherein the opening and the pass-through aperture of the removable lid are aligned with the central line of the base.

5. The device of claim 1, wherein the opening of the removable lid is configured to receive a portion of the coupling unit.

6. The device of claim 1, wherein the pin comprises a plurality of protrusions in proximity to an upper end of the pin.

7. The device of claim 1, wherein the food processing tool is configured to be connected to the pin extending from the base.

8. The device of claim 1, wherein the food processing tool further comprises an opening configured to receive the pin.

9. The device of claim 1, wherein the connector comprises a body with a cylindrical protrusion at an upper surface of the body and an opening at a lower surface of the body, the opening being configured to receive a plurality of protrusions at an upper end of the shaft.

10. The device of claim 1, wherein the connector is embedded within the pass-through aperture.

11. The device of claim 1, wherein the coupling unit comprises a main wall with a plurality of lateral apertures configured to receive protrusions extending from the slidable member, and an auxiliary wall extending from the main wall.

12. The device of claim 11, wherein the auxiliary wall is tapered.

13. The device of claim 11, wherein the auxiliary wall is configured to circumfuse a substantial part of a driver chuck.

14. The device of claim 1, wherein the slidable member of the coupling unit comprises a first elongated member and a second elongated member aligned to each other, and
wherein the first elongated member has a polygonal opening configured to receive a polygonal extrusion extending from the connector.

15. The device of claim 14, wherein the first elongated member and second elongated member extend in opposing directions from each other.

16. A food processing device, comprising:
a food processing container with a base and a circumferential wall extending from the base, and a removable lid with an opening and a pass-through aperture, the base having a cylindrical protrusion and a pin extending therefrom, the pin is aligned with a central line of the base;
a food processing tool with a shaft and a plurality of blades;
a connector; and
a coupling unit having a slidable member,
wherein the connector is configured to connect the food processing tool to the coupling unit,
wherein the coupling unit is configured to connect the connector to a driver,
wherein the slidable member of the coupling unit comprises a first elongated member and a second elongated member aligned to each other,
wherein the first elongated member has a polygonal opening configured to receive a polygonal extrusion extending from the connector, and
wherein the second elongated member is configured to be inserted in a driver chuck.

17. A food processing device, comprising:
a food processing container with a base and a circumferential wall extending from the base, and a removable lid with an opening and a pass-through aperture, the base having a cylindrical protrusion and a pin extending therefrom, the pin is aligned with a central line of the base;
a food processing tool with a shaft and a plurality of blades;
a connector; and
a coupling unit having a slidable member,
wherein the connector is configured to connect the food processing tool to the coupling unit,
wherein the coupling unit is configured to connect the connector to a driver,
wherein coupling unit comprises a main wall with a plurality of lateral apertures configured to receive protrusions extending from the slidable member, and an auxiliary wall extending from the main wall, and
wherein the auxiliary wall is lined with an elastic material and/or tapered.

18. The device of claim 17, wherein the auxiliary wall is lined with an elastic material.

19. The device of claim 18, wherein the auxiliary wall is tapered.

20. The device of claim 17, wherein the auxiliary wall is tapered.

* * * * *